Aug. 13, 1935.  W. H. PARKER  2,011,157
CALIBRATION MECHANISM FOR RECIPROCATING PISTON METERS
Filed Oct. 27, 1930
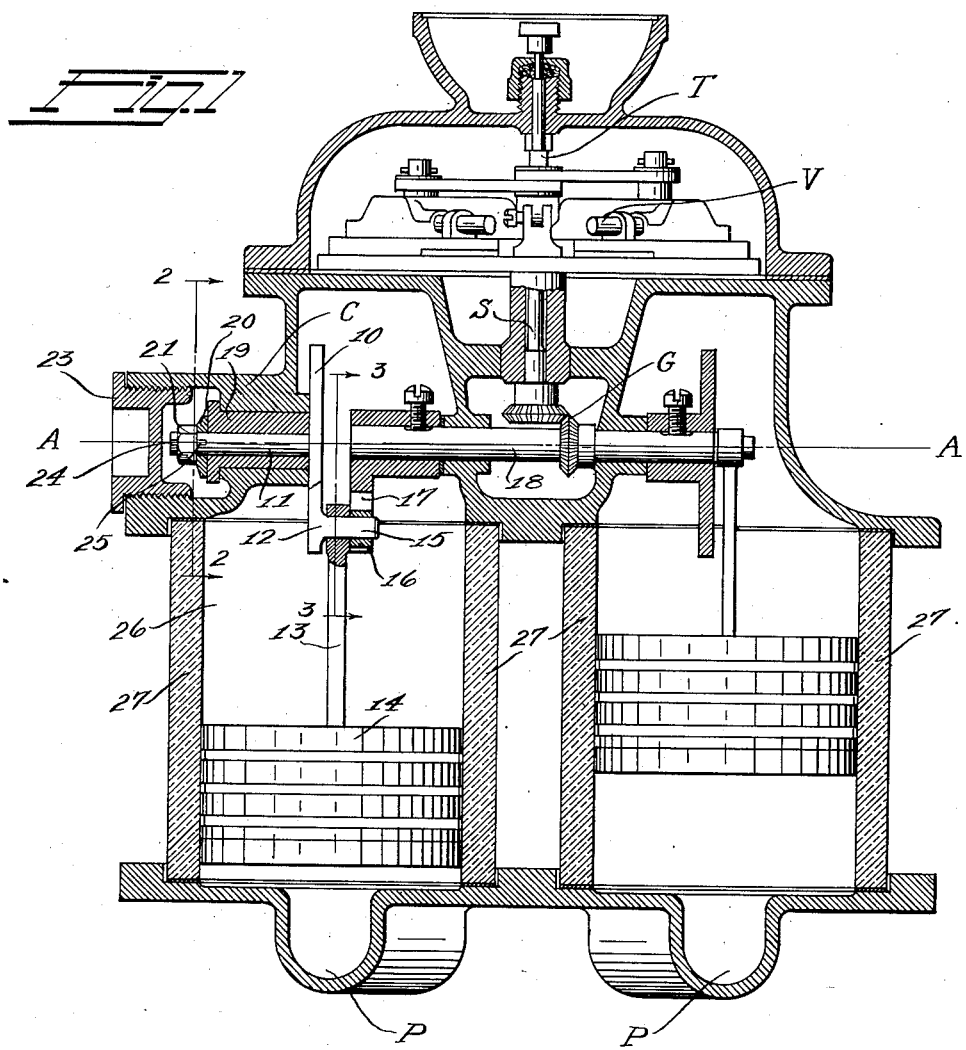
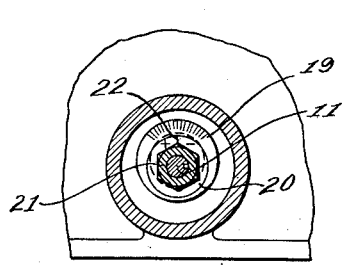
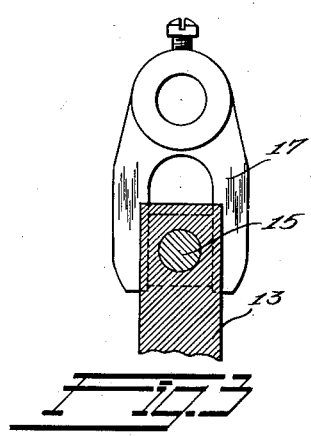
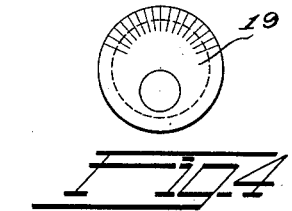
Inventor
W. H. Parker
Strauch & Hoffman
Attorneys Patented Aug. 13, 1935

2,011,157

UNITED STATES PATENT OFFICE 2,011,157

CALIBRATION MECHANISM FOR RECIPROCATING PISTON METERS

Walter H. Parker, Pittsburgh, Pa., assignor to Pittsburgh Equitable Meter Company, Pittsburgh, Pa., a corporation of Pennsylvania Application October 27, 1930, Serial No. 491,586

2 Claims. (Cl. 74—44)

The present invention relates to a fluid metering mechanism of the double acting or reciprocating piston type. Fluid meter mechanisms of this sort are particularly useful for gasoline dispensing use, and in order to render these meters accurate and to comply with various municipal and State regulations, it is necessary to equip such meters with some form of an adjustment to permit calibration. The calibration adjustment herein disclosed is simple and readily accessible from the exterior of the pump casing, which facilitates easy adjustment. Moreover, it is capable of accurate and close adjustment and since the adjustment member is provided with graduations, it is possible to make the adjustments with a certain amount of ease and precision.

The invention as disclosed attains the desired objects in calibration mechanism of this sort in furnishing an accurate, readily accessible and easily adjustable calibration means. The reciprocating piston is mounted for adjustment on an adjustable crank pin and the positioning of the crank pin can be accurately controlled from the exterior of the meter casing. The adjustment of the crank pin in a slotted arm is effected by means of a crank arm and an element for varying the position of the crank pin in its slot from the meter exterior, this element consisting, in the disclosed construction, in a simple rotatable eccentric bushing. The practical utility of the invention consists in the simple and accurate adjustment of the displacement of a reciprocating element in the interior of the meter, supported on a structure that is far in the interior of the meter and difficult to get at without dismantling the entire meter, by merely turning an exterior, readily accessible calibrated element. The mechanism provided for this purpose is simple and there is very little chance of excessive wear or of the mechanism getting out of order.

Further objects of my improved calibrating mechanism will appear from the complete disclosure of my invention which follows; reference being made to the following description and appended claims, taken in connection with the drawing which accompanies this specification.

In the drawing:—

Figure 1 is a vertical section through a fluid metering device of the reciprocating piston type showing my improved calibrating mechanism.

Figure 2 is a section on the line 2—2 of Figure 1, showing the graduated calibration dial.

Figure 3 is an enlarged section on the line 3—3 of Figure 1, showing the way in which the piston connecting rod and crank pin slides in slotted crank arm.

Figure 4 is an end elevation of the eccentric bushing member.

Referring to the drawing by reference characters in which like characters designate similar parts, P indicates generally the ports or passages through which the metered fluid passes, G indicates the motion transmitting gears, S indicates the shafting for operating the valving mechanism indicated generally at V, T indicates the shaft which drives the registering mechanism (not shown) which is adapted to be attached at the upper part thereof. This meter of the reciprocating plunger type is old and well known, and forms no part of the subject matter of this invention. The details and operation of such a type of meter are clearly set forth in an application for Letters Patent of Harry G. Weymouth, filed in the United States Patent Office, September 30, 1930, as Serial Number 485,513, to which reference is made for a more detailed description.

The calibrating mechanism, shown at the left hand side of Figure 1, and indicated generally by C, is constructed as follows:

A crank arm or wheel 10 is mounted for rotation on a shaft 11 and is formed at end 12 with a crank pin. Mounted on this crank pin is the piston rod 13 of the reciprocating piston 14. The crank pin 15 is rotatably mounted in block 16 which is slidably mounted in the slotted crank arm 17, attached to the main shaft 18 which operates the valving mechanism V and the registering shaft T.

The shaft 11 has mounted thereon an eccentric bushing 19 and an indicating washer 20 which is keyed to shaft 11, held against bushing 19, while the meter is in operation by lock nut 21 screwed on the outer end of shaft 11. On the washer 20 is placed an indicating mark 22, on either side of which is marked a plus and a minus sign, as shown in Figure 2. On the upper part of the annular surface of the end of eccentric bushing 19 are placed graduation marks which run to either side of a central zero mark as also indicated in Figure 2. Thus it will be seen that if the eccentric bushing is rotated with reference to the washer, an accurate measure of the angle of rotation may be obtained.

When it is desired to calibrate the meter in order to render its measurement of the quantity of fluid entering an accurate quantity, the outer member 23 is removed exposing the lock nut 21.

For ease in loosening this nut on shaft 11, a slot 24 is provided in the end of the shaft for the reception of a screw driver blade.

The lock nut 21 is then loosened so that the shaft 11 is free to turn in the eccentric bushing 19. The bushing 19 is then rotated with respect to shaft 11, while the indicating washer 20 is held stationary since it is keyed to shaft 11 by key member 25; and the angle of rotation, to either side, is readily ascertainable by noting the relative positions of the dial graduations and the indicating mark on the washer. As the bushing is rotated, the axis of shaft 11 is raised or lowered a certain amount in a vertical direction with respect to the axis of rotation of bushing 19, which is the same axis as the axis of rotation of main shaft 18 of the meter, and this motion is communicated through crank arm of disc 10, to the crank pin 15 mounted in block 16 and this block is caused to slide inwardly or outwardly in the slot formed in arm 17. This decreases or increases the effective length of the crank arm guiding the piston rod 13 of reciprocating piston 14. Thus this piston in its reciprocating travel in chamber 26 formed with glass walls 27, displaces a less or a greater volume of the measured fluid and the meter may be accurately calibrated to displace any desired volume of the fluid to be metered. As the crank pin 15 rotates about shaft 18, carrying with it piston 14, the eccentric bushing 19 rotates in the fixed member which forms part of the meter casing, about the axis A—A which is the axis of main shaft 18 of the meter.

Thus it will be seen that I have disclosed a simple, readily accessible and easily adjustable calibrating mechanism for calibrating fluid meters of the reciprocating piston type. It will be further noted that the dial graduations give an accurate and visual indication of the amount of rotation of the eccentric bushing necessary in order to accurately calibrate the meter.

It will also be noted that it is possible by this simple mechanism to adjust the length of travel of an element far in the interior of the meter and not readily accessible, by an easily adjustable and readily accessible external element.

This invention may be embodied in other specific forms without departing from the essential characteristics of the invention as herein disclosed, which embodiment is to be considered in all respects as illustrative and not restrictive. The scope of the invention is intended to be indicated by the appended claims rather than by the foregoing description and all changes that come within the range of equivalency of the claims are intended to be embraced therein.

What I claim and desire to secure by United States Letters Patent is:—

1. In a fluid meter, a casing, a crank shaft having a crank thereon, a piston having a connecting rod, a crank pin pivotally connected to said connecting rod and slidably connected to said crank, a bushing rotatably mounted in a recess in said casing, a shaft eccentrically supported in said bushing and having a second crank thereon supporting said crank pin, whereby rotation of said bushing varies the effective throw of said second crank, an indicating element for indicating the relative position of said bushing and shaft, means for locking said bushing and shaft against relative adjustment, and a plug for closing said recess.

2. A fluid meter of the reciprocating piston type comprising a casing, a crank shaft adapted to drive a register, a crank on said crank shaft, a piston having a connecting rod, a crank pin pivotally connected to said connecting rod and slidably connected to said crank, a second crank supporting said crank pin, said second crank being supported by a shaft and a bearing rotatably supported by said casing and eccentrically supporting said shaft, said bearing being adjustable to vary the radial position of said crank pin with respect to the crank shaft.

WALTER H. PARKER.